United States Patent
Nagami et al.

(10) Patent No.: US 6,304,577 B1
(45) Date of Patent: *Oct. 16, 2001

(54) NODE APPARATUS AND METHOD OF USING A VIRTUAL CONNECTION TO TRANSMIT A PACKET

(75) Inventors: Kenichi Nagami, Chiba-ken; Yasuhiro Katsube, Kanagawa-ken; Hisako Tanaka, Tokyo, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,708

(22) Filed: Jul. 21, 1997

(30) Foreign Application Priority Data

Aug. 29, 1996 (JP) .................................................. 8-228568

(51) Int. Cl.[7] .............................. H04L 12/56; H04L 12/28
(52) U.S. Cl. ............................................. 370/409; 370/395
(58) Field of Search ..................................... 370/351, 389, 370/395, 396, 397, 398, 399, 400, 409, 229, 230, 231

(56) References Cited

U.S. PATENT DOCUMENTS

| | | | |
|---|---|---|---|
| 5,287,535 | * | 2/1994 | Sakagawa et al. .................. 370/389 |
| 5,333,131 | * | 7/1994 | Tanabe et al. ..................... 370/397 |
| 5,452,296 | * | 9/1995 | Shimuzu ............................ 370/399 |
| 5,463,621 | * | 10/1995 | Suzuki .............................. 370/399 |
| 5,548,589 | * | 8/1996 | Jeon et al. ........................ 370/399 |
| 5,751,698 | * | 5/1998 | Cushman et al. ................... 370/252 |

FOREIGN PATENT DOCUMENTS 0 603 915 A2    6/1994  (EP) .

OTHER PUBLICATIONS

Katsube et al., "Internet Engineering Task Force," Internet Draft, Mar. 25, 1996.
Shelef, "SVC Signaling: Calling All Nodes," Data Communications, vol. No. 8, New York, Jun. 24, 1995; pp. 123–130.
Roux et al., "Broadband ISDN signalling techniques and benefits," Communication & Transmission, Paris, France, 1995; pp. 59–70.

* cited by examiner

Primary Examiner—Ajit Patel
Assistant Examiner—Brian Nguyen
(74) Attorney, Agent, or Firm—Finnegan, Henderson, Farabow, Garrett & Dunner, L.L.P.

(57) ABSTRACT

A node manages a virtual connection (VC) in a network such that at least one unused virtual connection to the neighboring node is established and registered. When a VC is needed to transmit a packet, the node obtains the required VC by selecting one of the registered unused VCs instead of setting up a new VC. When a VC in use becomes no longer necessary, the node registers the VC as an unused VC instead of releasing the VC.

25 Claims, 8 Drawing Sheets

UNUSED VC TABLE

| NEIGHBOURING NODE ADDRESS | NUMBER OF VCS | POINTER TO VC INFORMATION |
|---|---|---|
| B | 2 | → a,0/100 — → a,0/101 X |
| C | 2 | → a,0/200 — → a,0/201 X |
| D | 1 | → b,0/100 X |

I/F,VPI/VCI

FIG.4

— DEDICATED VC
---- DEFAULT VC
— PHYSICAL LINK

IP ROUTING TABLE

| DESTINATION ADDRESS | I/F | VPI/VCI | NEXT-HOP ADDRESS |
|---|---|---|---|
| H2 | b | x | R2 |
| H3 | b | 0/200 | x |
| H4 | b | 0/300 | x |

DEFAULT VC TABLE

| NEXT-HOP ADDRESS | VPI/VCI |
|---|---|
| R2 | 0/100 |
|  |  |

NODE APPARATUS AND METHOD OF USING A VIRTUAL CONNECTION TO TRANSMIT A PACKET

BACKGROUND ART

The present invention relates to network systems. More specifically, the invention relates to a node apparatus having an interface with a virtual-connection-oriented network and a method for managing a virtual connection to transmit packets from the node apparatus.

To transfer packets through a virtual connection in a virtual-connection-oriented network, such as an ATM (Asynchronous Transfer Mode) network, a virtual connection is set up one of two ways:

1) all virtual connections between nodes in the network are set up in advance of using the virtual connections to transfer packets (e.g., PVC (Permanent Virtual Connection) or VP (Virtual Path) in the ATM network); or 2) an adequate virtual connection is set up when it is required in order to transfer packets, and it is released when the transfer of packets terminates (e.g., SVC (Switched Virtual Connection) in the ATM network).

The first method makes it possible to use a virtual connection without waiting for setup when a node is starting to transmit a packet. However, a prior setup of all virtual connections by a human network manager has great difficulties. In addition, in the PVC method, it is difficult to determine how many virtual connections to preset. In the VP method, the usage of virtual connections may be inefficient because many virtual connections of the fixed number (e.g., $2^{16}$) are necessarily set up between all neighboring nodes.

The second method sets up a virtual connection from a first node to a second node by, for example, ATM signaling when the first node is transmitting a packet to the second node, and releases the virtual connection by ATM signaling when the first node finishes transmitting packets to the second node. Because the setup of a virtual connection starts after the virtual connection becomes necessary, a delay due to the setup exists until the node becomes able to transmit the packet. Moreover, the frequency of setup/release of virtual connections is high because the virtual connection is released each time it becomes unnecessary. This require the highest performance nodes and switches in the network for in setup/release signaling.

DISCLOSURE OF THE INVENTION

It is therefore an object of the present invention to provide a mechanism for obtaining a virtual connection with a smaller delay and with fewer setup/release actions using signaling.

A node consistent with this invention that is connected to a virtual-connection-oriented network comprises VC means for setting up and releasing virtual connections with a neighboring node; means for transmitting a packet to the neighboring node through an established virtual connection; and means for controlling the VC means to maintain at least one virtual connection with the neighboring node not currently in use by the means for transmitting.

A method consistent with this invention of managing a node connected to a virtual-connection-oriented network comprises the steps of setting up and releasing virtual connections with a neighboring node; transmitting a packet to the neighboring node through an established virtual connection; and maintaining at least one virtual connection with the neighboring node not currently in use by the means for transmitting.

Other features and advantage of the present invention will be become apparent from the following description taken in conjunction with the accompanying drawings. Both the foregoing general description and the following detailed description provide examples consistent with this invention and explain how to make and use systems and methods consistent with the invention. These description do not restrict the claimed invention.

BRIEF DESCRIPTION OF THE DRAWINGS

FIG. 4 shows sample contents of the unused VC table in FIG. 2.

BEST MODE FOR CARRYING OUT THE INVENTION

Now, the preferred embodiments according to the present invention will be described in detail. Though the following description involves an ATM network, the present invention can be practiced in another virtual-connection-oriented network (e.g., frame relay) in a similar way as in the ATM network.

A. General Description

A node consistent with the present invention has set up several VCs (e.g., SVCS) by ATM signaling in advance, and has registered these VCs as unused VCs. When a VC becomes necessary to transmit (transfer) a packet, the node obtains the required VC by selecting one of the registered unused VCs instead of setting up a new VC. When a VC in use becomes unnecessary because it is finished being used, the node registers the VC as an unused VC, instead of releasing the VC.

The waiting time until a VC becomes usable can be shortened by eliminating the VC setup time, while signaling can still be used for setting up VCs. Also, more VCs than those currently being used for transmitting (transferring) packets can keep established, and the VCs can be reused so the frequency of setup/release of VCs by signaling and VC setup loads for nodes and switches in the network can be reduced.

B. Example Operation

Figure 1:
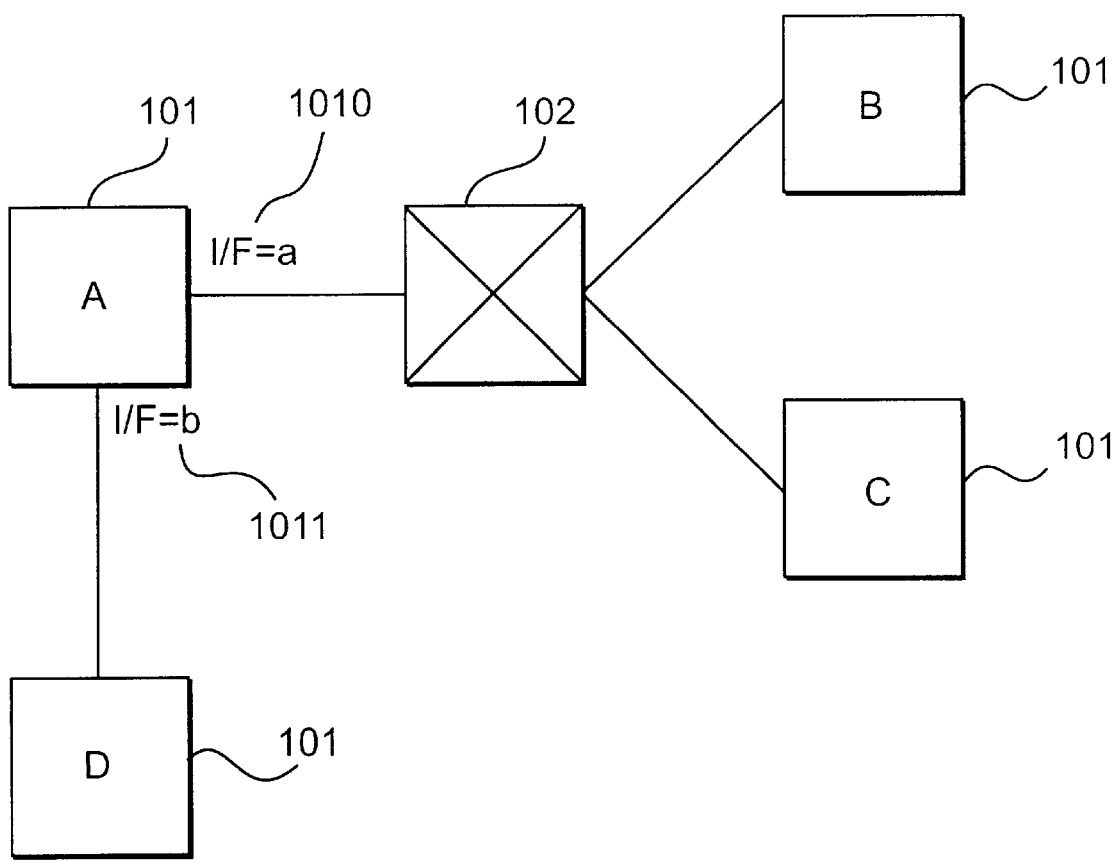
FIG. 1 shows an exemplary network topology consistent with the present invention.

An exemplary case of establishing VCs to transfer packets from node 101A to node 101B, C, or D in the network shown in FIG. 1 will be described. Node 101A has interfaces (a) 1010 and (b) 1011. Interface (a) 1010 connects ATM switch 102 and ATM switch 102 connects node 101B and C. Interface (b) 1011 connects node 101D. Each connection between nodes is implemented by ATM. A node can be either a router or a host.

Figure 2:
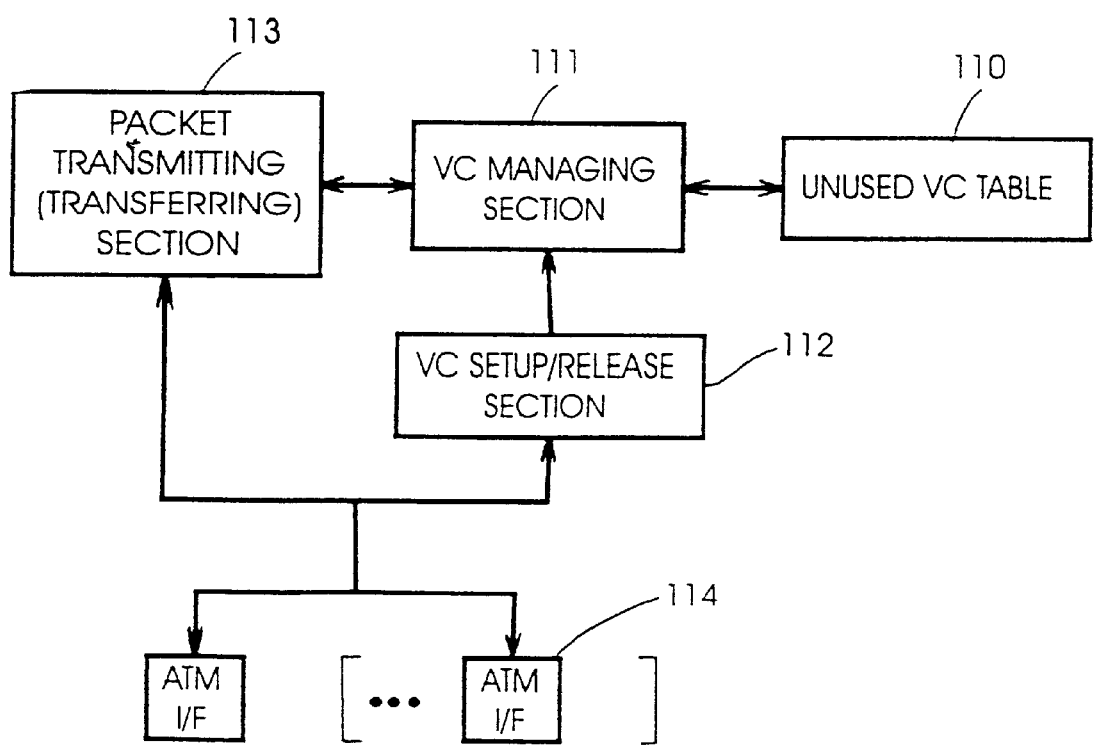
FIG. 2 is a functional block diagram showing a configuration of a node in the network of FIG. 1.

As shown in FIG. 2, node 101A includes unused VC table 110, VC managing section 111, VC setup/release section 112, and packet transmitting (transferring) section 113. These sections can be implemented by either software or hardware. Node 101A also includes one or more ATM I/F 114. For multiple I/Fs, the I/Fs can include one or more I/F other than ATM (e.g., Ethernet).

Unused VC table 110 stores information of established VCs which are not in current use. The VCs registered in unused VC table 110 constitute a pool of unused VCs. VC managing section 111 obtains/returns a VC from/to unused VC table 110, in response to requests from packet transmitting (transferring) section 113. VC managing section 111 also manages the number of unused VCs and controls VC setup/release section 112, such that the unused VCs the number of which is within a prescribed range exist.

Figure 3:
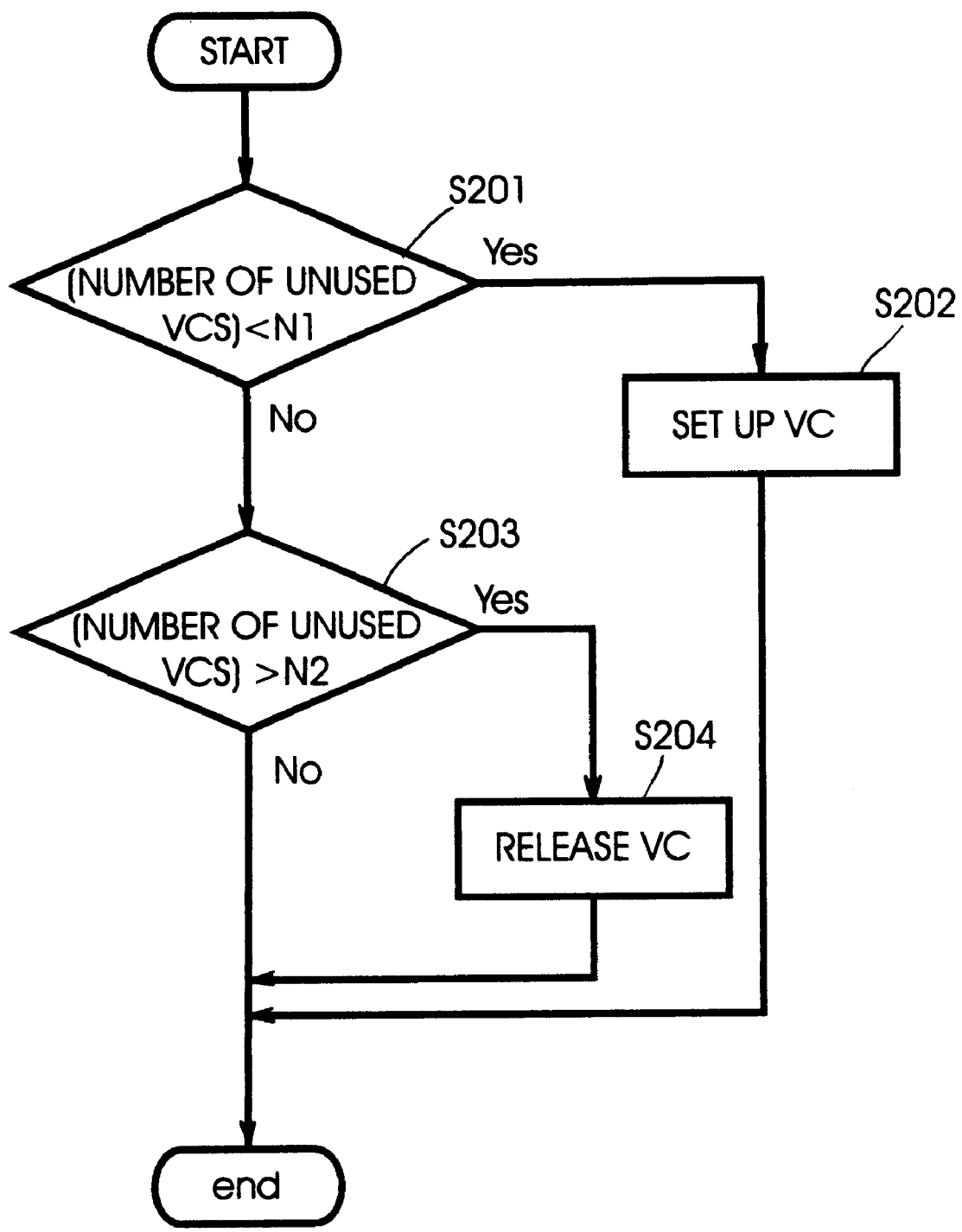
FIG. 3 is a flowchart showing an operation for managing unused VCs.

FIG. 3 shows an operation for managing unused VCs to form the pool of unused VCs. This operation is performed when a node is activated, when a VC is obtained from or returned to the pool, or periodically while a node is working. N1 in step S201 is the minimum number of unused VCs, and N2 in step S203 is the maximum number of unused VCs. The operation results in keeping the number of unused VCs within a range from N1 to N2.

Hereinafter, an example of N1=1, N2=3 will be taken for explanation. VC managing section 111 executes the flowchart of FIG. 3 for each neighboring node. A node can recognize which nodes are neighboring based on information preset by a human network manager or using routing protocol automatically exchanged between nodes. The values of N1 and N2 can vary with individual neighboring nodes.

VC managing section 111 compares the current number of unused VCs to a neighboring node in question with the minimum number N1 (S201). If that number is smaller than N1 (S201 Yes), VC managing section 111 orders VC setup/release section 112 to set up one or more SVCs to the neighboring node through ATM signaling (S202). The number of VCs to be set up is determined to maintain the number of unused VCs within a range of N1 to N2. When the setup is completed, VC managing section 111 registers information of the SVCs set up into unused VC table 110 as shown in FIG. 4.

If the current number of unused VCs is N1 or more (S201 No), VC managing section 111 compares the current number of unused VCs with the maximum number N2 (S203). If that number is larger than N2 (S203 Yes), VC managing section 111 selects one or more unused VC to the neighboring node to be released referring to unused VC table 110, and orders VC setup/release section 112 to release the selected VC(s) through ATM signaling (S204), such that the number of unused VCs becomes within a range of N1 to N2. If the current number of unused VCs is N1 or more and N2 or less (S203 No), no action is taken.

When VC managing section 111 at node 101 A operates as described above in the network shown in FIG. 1, unused VC table 110 shown in FIG. 4 will be created. The table illustrates that there are 2,2,1 unused VCs for neighboring nodes 101B, C, D, respectively. VCs of I/F=a, VPI/VCI=0/100 and I/F=a, VPI/VCI=0/101 are maintained as unused VCs to node B. VCs of I/F=a, VPI/VCI=0/200 and I/F=a, VPI/VCI=0/201 are maintained as unused VCs to node C. A VC of I/F=b, VPI/VCI=0/100 is maintained as unused VCs to node D.

Figure 5:
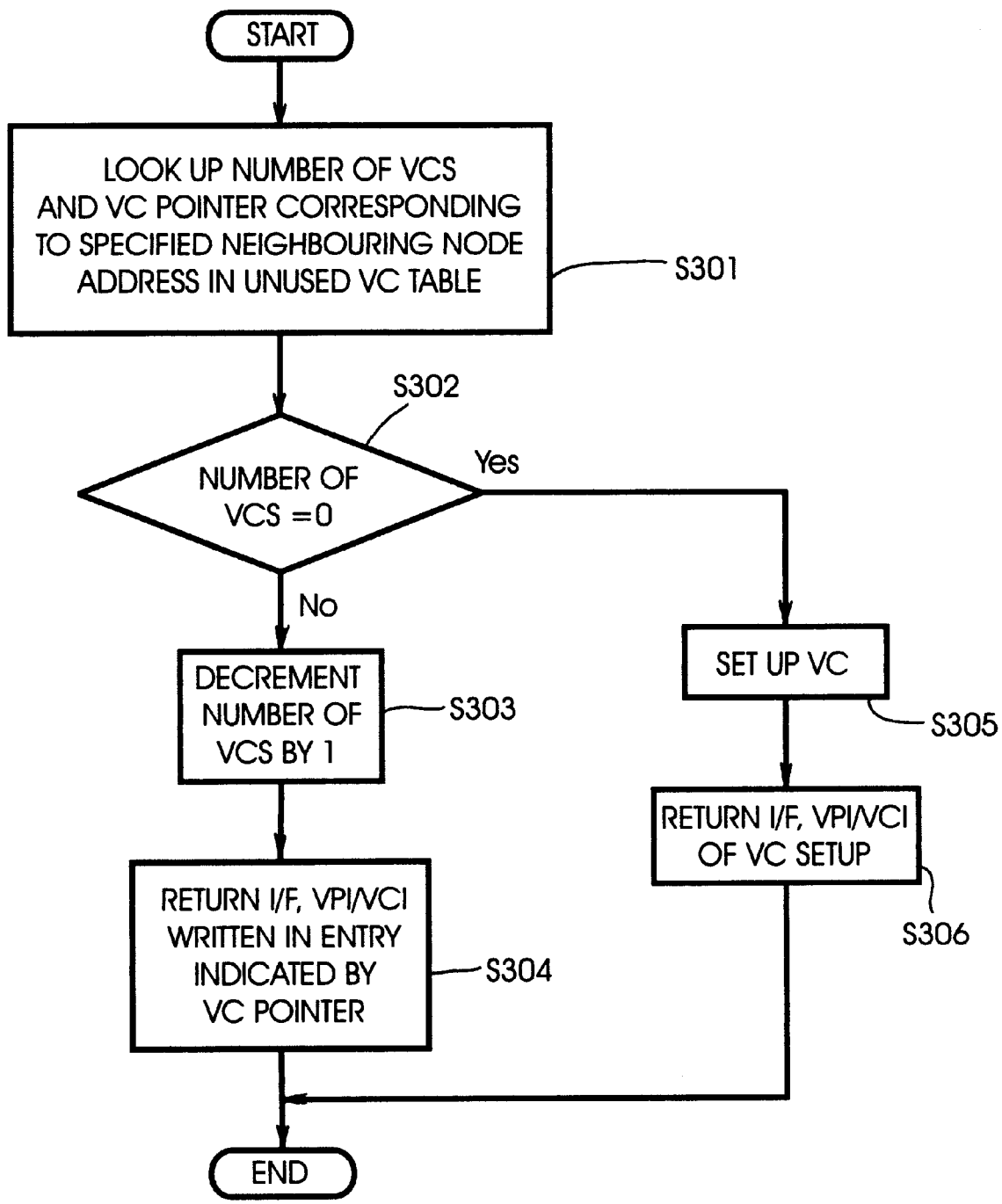
FIG. 5 is a flowchart showing an operation for obtaining a virtual connection from a pool of unused VCs.

FIG. 5 shows an operation for obtaining a VC from the pool of unused VCs, for example, when node 101A is starting to transmit (transfer) a packet to node B. Packet transmitting (transferring) section 113 requests VC managing section 111 to obtain a VC to a next-hop node B. VC managing section 111, in response to this request, looks up the number of unused VCs and a pointer to VC information corresponding to the specified neighboring node's address (in this example, node B) in unused VC table 110 of FIG. 4 (S301).

If the number of unused VCs is zero (S302 Yes), VC managing section 111 orders VC setup/release section 112 to set up a new SVC (S305), and packet transmitting (transferring) section 113 uses this newly established SVC (S306). A situation where the number of unused VCs is zero might occur, for example, if the operation shown in FIG. 3 malfunctioned.

If the number of unused VCs is not zero (S302 No), VC managing section 111 decrements the number of unused VCs in unused VC table 110 by 1 (S303), and returns an I/F and a VPI/VCI written in an entry included in the list indicated by the VC pointer in unused VC table 110 to packet transmitting (transferring) section 113 (S304). In this example, the number of unused VCs becomes 1 and a VC of I/F=a, VPI/VCI=0/100 is picked up (deleted from unused VC table 110). Packet transmitting (transferring) section 113 can use this selected VC without waiting for setup of a VC by signaling.

Figure 6:
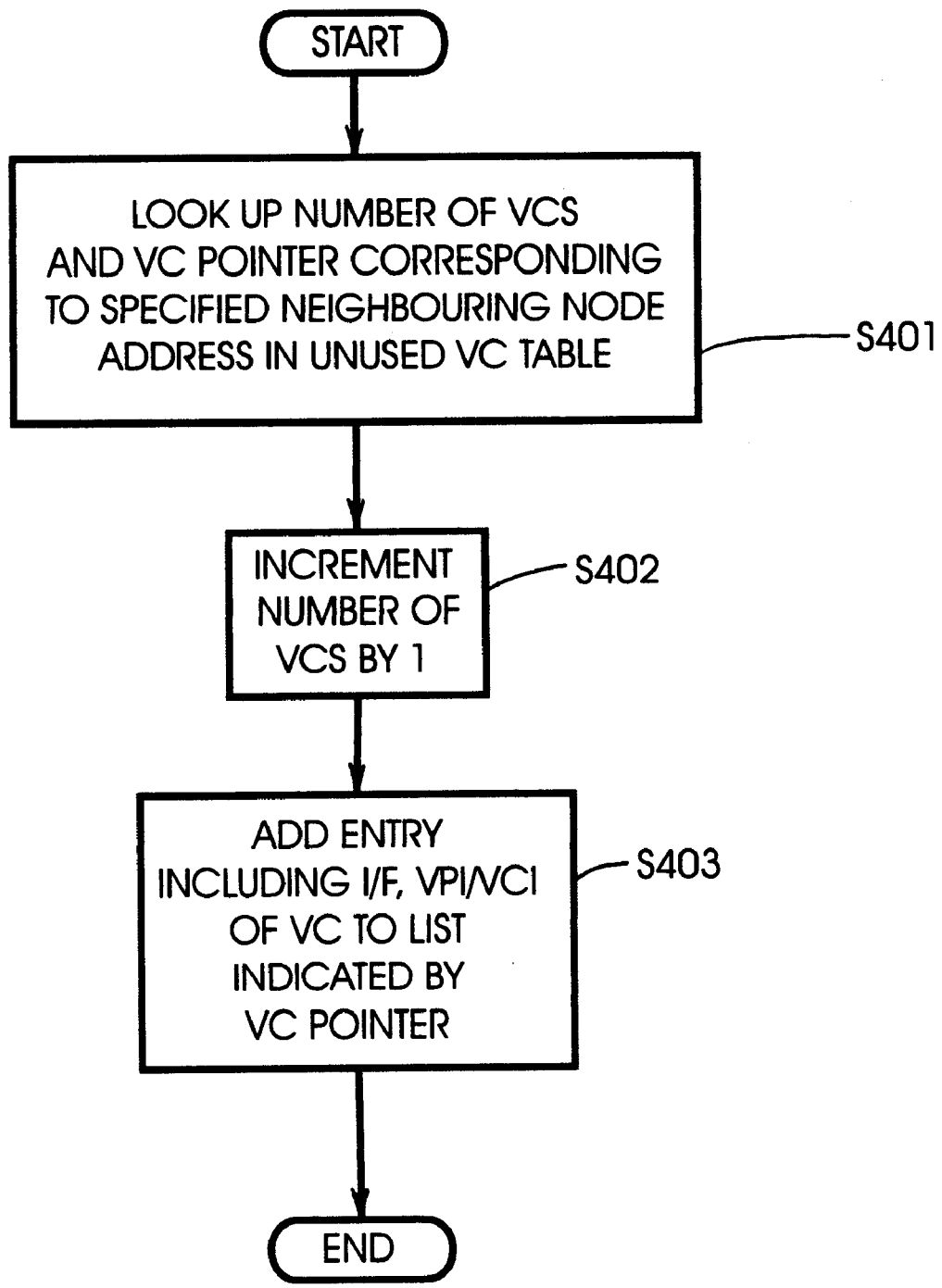
FIG. 6 is a flowchart showing an operation for returning a VC to the pool of unused VCs.

VC managing section 111 returns a VC to unused VC table 110 when it is notified by packet transmitting (transferring) section 113 of a termination of use of the VC, as shown in the flowchart shown in FIG. 6. Specifically, packet transmitting (transferring) section 113 notifies VC managing section 111 of the termination of use of a VC to a next-hop node B. In response to this notification ,VC managing section 111 looks up the number of unused VCs and a pointer to VC information corresponding to the specified neighboring node's address (in this example, node B) in unused VC table 110 (S401). VC managing section 111 increments the number of unused VCs in unused VC table 110 by 1 (S402), and adds an entry including I/F and VPI/VCI of the VC to be returned to the list indicated by the VC pointer in unused VC table 110 (S403). For example, when the VC of I/F=a, VPI/VCI=0/100 to node B is returned according to this operation, the contents of unused VC table becomes as shown in FIG. 4 again.

The operation for managing unused VCs shown in FIG. 3 can be executed periodically (as a background job) independently of operations for obtaining/returning a VC shown in FIGS. 5 and 6. Alternatively, the operation for managing unused VCs can be started, for example, each time after the number of unused VCs is changed by the operation of FIG. 5 or FIG. 6.

The case where a node has set up several SVCs by ATM signaling in advance was described above. The present invention can also be practiced by the following embodiments: as a initial condition, several PVCs (the number can be determined arbitrarily within a range of N1 to N2) are set up between neighboring nodes. Then, when the number of VCs in current use increases and the number of unused PVCs decreases beyond N1, the node sets up SVC(s) as in step S202. When the number of VCs in current use decreases and the total number of unused PVCs and SVCs increases beyond N2, the node releases SVC(s) until the total number becomes N2, as in step S204. In this case, the total number of unused PVCs and SVCs is treated as the number of unused VCs, and both PVCs and SVCs constitute one pool of unused VCs. It may be preferable to choose a PVC if possible rather than a SVC when obtaining a VC from the pool to use it.

As described above, a request for obtaining a VC is issued by packet transmitting (transferring) section 113 when a new VC becomes necessary. Packet transmitting (transferring) section 113 issues the request when it needs a VC to transmit a packet but finds none available. A router, for example, can issue the request when it finds no VC to be used to transfer a packet on receiving the packet.

The VC sought to be used is a default VC to a next-hop node, in a network where an ordinary hop-by-hop packet transfer is performed. In this case, if the default VC does not exist, the request for obtaining a VC is issued.

Alternatively, the VC sought to be used is a VC dedicated to a specified packet flow to which the packet to be transmitted (transferred) belongs, and is in a network having a policy that a dedicated VC should be used to transmit (transfer) a packet belonging to a specified packet flow. The dedicated VC should not be used to transmit (transfer) a packet whose flow is other than the specified flow, even if the next-hop node is the same. In this case, if the dedicated VC for the specified flow does not exist, the request for obtaining a VC is issued.

The packet belonging to the specified flow is a packet containing specified information. The specified information can be any one or combination of source IP (network-layer) address, destination IP address, IP address prefix, port number of transport-layer, identifier of protocol whose layer is higher than the transport-layer, and flow ID of IPv6.

Packet transmitting (transferring) section 113 can also issue a request for obtaining a VC when a new VC is requested by protocol exchanged between neighboring nodes. For example, it can issue the request on receiving a Path or Resv message of RSVP (Resource reSerVation Protocol), based on the message. Here, if the protocol specifies a packet flow, a VC dedicated to the specified flow will be requested.

On the other hand, a request for returning a VC is issued by packet transmitting (transferring) section 113 when the VC becomes unnecessary. Packet transmitting (transferring) section 113 can issue the request when it has not transmitted a packet through that VC for a prescribed period, or when it is requested to release that VC by another node with some protocol.

Figure 7:
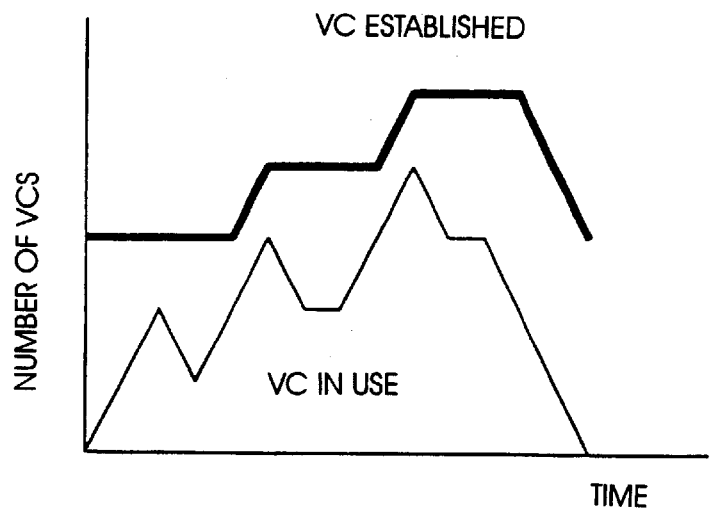
FIG. 7 shows an exemplary transition of the number of VCs.

One of the effects of the present embodiments is that the VC setup loads for nodes and switches can be reduced. FIG. 7 is a diagram that explains this effect conceptually. The frequency of setup/release of VCs by signaling becomes the times of increase and decrease of the number of VCs in use (thin line) according to the conventional SVC method, while the frequency is reduced to the times of increase and decrease of the number of established VCs (bold line) according to the present method.

C. Implementation in a Cell Switched Router (CSR) Case

CSR (Cell Switched Router) is a router that can transfer packets on cell-by-cell basis using ATM switches, and can transfer packets by network-layer (e.g., IP) forwarding. Cell-by-cell transfer may be called cut-through transfer or datalink-layer transfer. Using ATM switch in a router at a boundary between logical networks (e.g., IP subnets) makes it possible to transfer packets with high-throughput and low-latency in an inter-network environment.

Specifically, each CSR on the route of a certain communication performs hop-by-hop IP forwarding by assembling received cells to a packet and analyzing a destination IP address, while each CSR on the route of a certain (specified) communication performs cell-by-cell transfer, bypassing IP processing, by referring to a virtual connection identifier (e.g., VPI/VCI) in a received cell.

A VC used for transferring packets to be processed hop-by-hop is a default VC. A VC used for transferring packets to be processed on cell-by-cell basis even at a router (CSR) is a dedicated VC. The dedicated VCs are prepared for respective specified communications, because a router cannot see the contents of IP packets and can recognize which communication a received cell is only by a virtual connection identifier when transferring on cell-by-cell basis. For example, each dedicated VC is used to transfer packets to each corresponding destination network or destination host.

Figure 8:
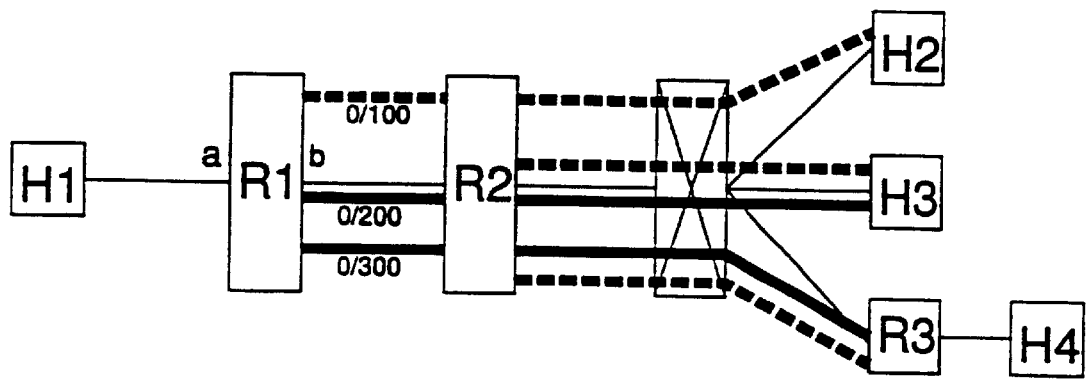
FIG. 8 shows another network topology consistent with the present invention.

FIG. 8 shows an exemplary network topology in which CSR technology is applied. Packets destined to node H2 are transferred hop-by-hop through a default VC from R1 to R2 and from R2 to H2. VCs dedicated to a communication to destination host H3 are set up not only between R2 and H3, but also between R1 and R2. VCs dedicated to a communication to destination host H4 are set up not only between R2 and R3 but also R1 and R2. Thus, from R1 to R2, a plurality of dedicated VCs exist, each of which is dedicated to each specified communication flow.

A new cell-by-cell transfer from R1 through R2 to a new node H5 may require one more dedicated VC from R1 to R2. Consequently, to one neighboring node (e.g., from R1 to R2), several VCs are required and set up/released. Preserving a prescribed number of spare VCs according to the present invention will be effective especially in such a situation.

Figures 9, 10:
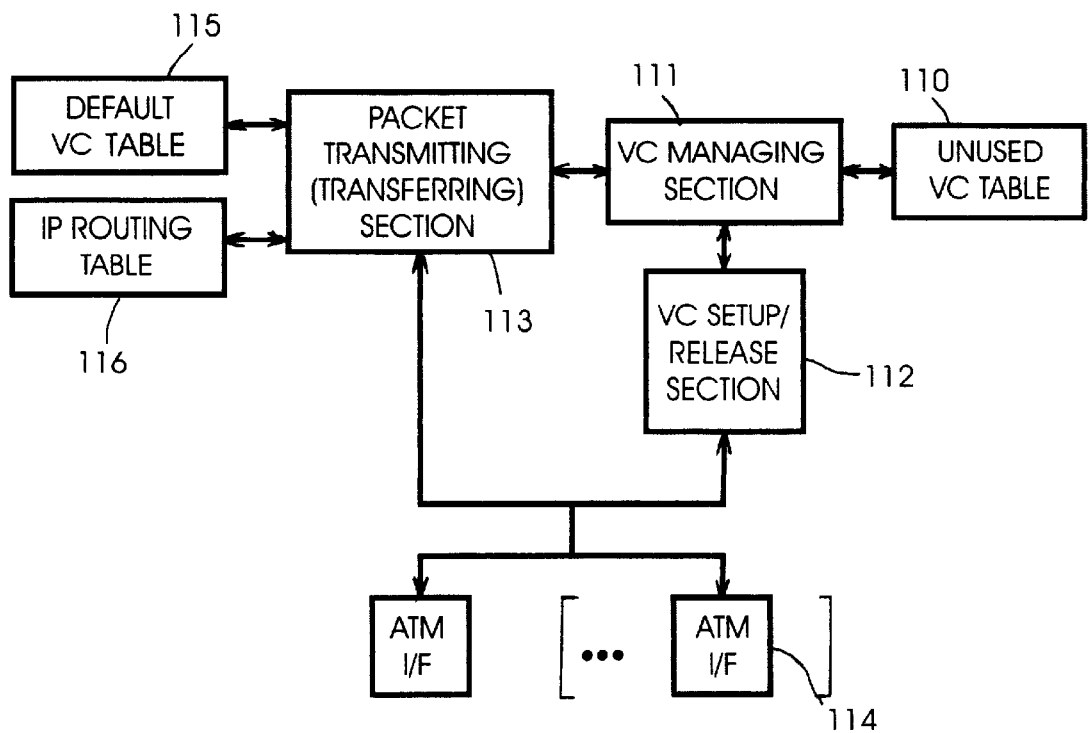
FIG. 9 is a functional block diagram showing a configuration of a node for the network in FIG. 8.
FIG. 10 shows sample contents of the IP routing table and the default VC table in FIG. 9.

FIG. 9 shows an exemplary configuration of a node (R1) for performing the present method. One difference from the node shown in FIG. 2 is that in the node shown in FIG. 9, packet transmitting (transferring) section 113 operates referring to default VC table 115 and IP routing table 116. FIG. 10 shows exemplary contents of these tables.

On transmitting (transferring) a packet, packet transmitting (transferring) section 113 searches IP routing table 116 using a destination address included in a packet to be transmitted (transferred) as a key. When the packet is to be transferred hop-by-hop, section 113 finds an I/F and a next-hop address (R2), and then searches default VC table 115 using the next-hop address as a key. Then, section 113 finds that it should use a VC of VPI/VCI=0/100 (a default VC to next-hop R2) to transmit (transfer) the packet destined to H2. If R1 has a packet to be transferred through R2 to a new node H6 hop-by-hop, section 113 of R1 will find the same next-hop address (R2) and the same VC (VPI/VCI=0/100) to be used.

When the packet is to be transferred cell-by-cell, section 113 finds an I/F and a VPI/VCI. Thus, section 113 finds that it should use a VC of VPINVCI=0/200 (a dedicated VC to destination H3) to transmit (transfer) a packet destined to H3, or finds that it should use a VC of VPI/VCI=0/300 (a dedicated VC to destination H4) to transmit (transfer) a packet destined to H4.

On adding a new entry to IP routing table 116, a node has to obtain a VC. For example, assume a VC dedicated to destination H4 becomes necessary and no entry of destination address H4 (or no VPI/VCI in the entry of destination address H4) is written in IP routing table. Packet transmitting (transferring) section 113 can recognize that the dedicated VC to destination H4 becomes necessary when examining contents of a packet to be transmitted (or a packet received) destined to H4, or when exchanging protocol from/to a neighboring node in advance of performing cell-by-cell transfer (e.g., FANP (Flow Attribute Notification Protocol).

Packet transmitting (transferring) section 113 issues a request for obtaining a VC to R2 to VC managing section 111, when recognizing that the dedicated VC to H4 becomes necessary. VC managing section 111 is operating according to FIGS. 3, 5 and 6, and selects a desired VC from unused VC table 110 to return I/F and VPI/VCI of the selected VC to packet transmitting (transferring) section 113. Packet transmitting (transferring) section 113 registers the returned I/F and VPINVCI in IP routing table 116 as a dedicated VC to destination H4. VC managing section 111 treats a VC that is not registered in default VC table 115 or IP routing table 116 as an unused VC.

If, for example, a dedicated VC to destination H3 becomes unnecessary, packet transmitting (transferring) section 113 deletes VPI/VCI of the dedicated VC from the entry of destination address H3 (and instead writes next-hop address R2) and notifies VC managing section 111 of termination of using the dedicated VC. VC managing section 111 returns I/F=b, VPI/VCI=0/200 to unused VC table 110 as an unused VC to neighboring node R2.

In this example, a dedicated VC for each specified "destination" is used. The node can also operate in a similar way, however, in a case of using a dedicated VC for each specified "packet flow" whose example was shown in the previous embodiment.

R2 in the above example may be a router that does not perform cell-by-cell basis transfer but applies a certain specified processing to a packet belonging to a specified flow. Specifically, R1 sends packets belonging to a specified flow through a dedicated VC, and then R2 can know the flow of a received packet from the VC identifier and, for example, can give a higher priority in transfer scheduling to the received packet belonging to the specified flow. In such a situation also, forming a pool of spare VCs according to the present invention will be effective because quite a few VCs to one neighboring node becomes necessary/unnecessary frequently.

In the above embodiments, it may be desirable to relate a VC to a specified flow by both ends of the VC. To perform that, it is preferable to give the VC an identifier that can be uniquely identified by both ends of the VC. However, if an ATM switch exists between neighboring nodes (e.g., 102 in FIG. 1) and a SVC is set up through the switch, a value of VPI/VCI of the SVC will be changed at the switch, not the same at individual neighboring nodes. Thus, the unique identifier (different from VPI/VCI) of the SVC may be determined by message exchange between the neighboring nodes. In such a case, it is possible to give the unique identifier to a VC on setting it up at step S202 of FIG. 3 and to register the unique identifier in unused VC table 110 in addition to I/F, VPI/VCI. When a new VC becomes necessary, the unique identifier of a selected VC may also be returned at S304 of FIG. 5.

In addition to those already mentioned above, persons of ordinary skill will realize that many modifications and variations of the above embodiments may be made without departing from the novel and advantageous features of the present invention.

For example, an embodiment according to the present invention where NHRP (Next-Hop Resolution Protocol) is available will be considered. NHRP is used for inquiring of a route server about a destination IP address, obtaining a link address (e.g., ATM address) of the destination or a router closest to the destination from the server, and setting up a virtual connection to the destination or the closest router based on the link address. Treating this link address as the neighboring node address in the above-mentioned embodiments makes it possible to keep a prescribed number of spare VC(s) existing for immediate use.

Accordingly, all such modifications and variations are intended to be included within the scope of the appended claims. The embodiments in the specification are only exemplary. The following claims define the true scope and spirit of the invention.

What is claimed is:

1. A node, connected to a virtual-connection-oriented network, comprising:

VC (virtual connection) means for setting up a virtual connection with a neighboring node;

means for transmitting a packet to the neighboring node through the virtual connection set up by the VC means;

means for maintaining virtual connections that have been set up by the VC means and are not in use by the means for transmitting: and means for controlling the VC means to set up a new virtual connection, such that the means for maintaining holds at least one virtual connection with the neighboring node that is not currently in use by the means for transmitting by including said new virtual connection.

2. The node according to claim 1, further comprising:

a memory, coupled to the VC means, for storing information about virtual connections with the neighboring node that are not currently in use by the means for transmitting.

3. The node according to claim 2, wherein the means for transmitting includes:

means for determining a necessity of a virtual connection to transmit the packet; and means for changing a state of the virtual connection according to the means for determining by referring to information stored within the memory.

4. The node according to claim 2, wherein the memory includes:

a portion for storing an identifier for each virtual connection, the identifier uniquely identifying the virtual connection between the neighboring node and the node.

5. The node according to claim 2, wherein the means for transmitting includes:

means for determining a necessity of a virtual connection dedicated to a specified flow to transmit the packet belonging to the specified flow; and means for changing a state of the virtual connection as dedicated to the specified flow according to the means for determining by referring to information stored within the memory.

6. The node according to claim 1, wherein the VC means includes:

means for performing signaling to set up or release the virtual connection.

7. The node according to claim 1, wherein the means for transmitting includes:

means for transmitting the packet through one of the virtual connections set up by the VC means.

8. The node according to claim 7, wherein the means for transmitting further includes:

means for transmitting the packet through a preset permanent virtual connection.

9. The node according to claim 1, wherein the VC means includes:

means for releasing at least one of the virtual connections maintained by the means for maintaining, and means for controlling further includes means for controlling the VC mean to release an existing virtual connection, such that the means for maintaining holds at least one virtual connection with the neighboring node that is not currently in use by the means for transmitting by excluding said existing virtual connection.

10. The node according to claim 9, wherein the means for controlling further comprises:
means for detecting the number of virtual connections with the neighboring node not in use by the means for transmitting; and
means for causing the VC means to set up or release a virtual connection with the neighboring node based on the detected number of virtual connections.

11. A node, connected to a virtual-connection-oriented network, comprising:
a VC (virtual connection) unit configured to set up or release a virtual connection with a neighboring node;
a memory, coupled to the VC unit, for storing information about a first virtual connection available for transferring a packet to be transmitted to the neighboring node and about a second virtual connection dedicated to transfer of a packet belonging to a specified flow and to be transmitted to the neighboring node;
a determining unit configured to determine whether to transmit a packet through the first or second virtual connection by referring to information stored within the memory;
a transmitting unit configured to transmit a packet through the determined virtual connection; and
a control unit configured to control the VC unit to maintain at least one unused virtual connection with the neighboring node capable of being dedicated to a new specified flow.

12. A method of managing a virtual connection in a network, comprising the steps of:
maintaining established and unused virtual connections between neighboring nodes in the network;
setting up a new virtual connection between the neighboring nodes when the number of unused virtual connections between the nodes is less than a first predetermined number; and
releasing one of the established and unused virtual connections between the neighboring nodes when the number of unused virtual connections between the nodes exceeds a second predetermined number.

13. The method according to claim 12, further comprising the steps of:
obtaining one of the established and unused virtual connection as a new virtual connection when a new virtual connection between the neighboring nodes becomes necessary to transmit a packet; and
returning the obtained virtual connection as an established and unused virtual connection when the obtained virtual connection finishes being used to transmit a packet.

14. The method according to claim 13, wherein the step of obtaining includes the steps of:
examining a new packet received or to be transmitted; and
determining that the new virtual connection becomes necessary when a virtual connection to be used to transmit the new packet does not exist.

15. The method according to claim 13, wherein the step of obtaining includes the step of:
determining that the new virtual connection becomes necessary when the new virtual connection is required by a protocol message.

16. The method according to claim 13, wherein the step of returning includes the step of:
determining that the established virtual connection finishes being used when no packet is transmitted through the established virtual connection for a prescribed period of time.

17. The method according to claim 13, wherein the step of returning includes the step of:
determining that the established virtual connection finishes being used when release of the established virtual connection is required by a protocol message.

18. The method according to claim 13, wherein the step of obtaining includes the step of:
determining that the new virtual connection becomes necessary when a virtual connection dedicated to transfer of a packet belonging to a specified flow does not exist.

19. The method according to claim 13, further comprising the steps of:
examining a message indicating an identifier of the virtual connection the identifier uniquely identifying the virtual connection between the neighboring nodes; and
storing the identifier of the established virtual connection indicated by the message prior to obtaining the virtual connection.

20. The method according to claim 13, wherein the steps of setting up and releasing are executed independently of executing the steps of obtaining and keeping.

21. The method according to claim 13, wherein the steps of setting up and releasing are executed after executing the steps of obtaining and keeping.

22. A method of managing a virtual connection in a network, comprising the steps of:
setting up at least one new virtual connection to maintain at least one unused virtual connection to a neighboring node capable of being dedicated to transfer of a packet belonging to a new specified flow;
storing first information of a first virtual connection available for transferring a packet to be transmitted to the neighboring node;
storing second information of a second virtual connection dedicated to a specified flow, the second virtual connection being selected from said at least one unused virtual connection when the second virtual connection becomes necessary to transmit a packet belonging to the specified flow; and
transmitting a packet through one of the first and second virtual connections, referring to one of the first and second information.

23. A method of managing a node connected to a virtual connection-oriented network, comprising the steps of:
transmitting a packet to a neighboring node through an established virtual connection;
maintaining one or more unused virtual connections with the neighboring node that has been established and are not currently in use for transmitting; and
setting up a new virtual connection with the neighboring node, so as to maintain one or more unused virtual connections with the neighboring node, by including the new virtual connection in the unused virtual connections.

24. A network of nodes, wherein each of the nodes comprises:
a VC (virtual connection) unit configured to set up a virtual connection with a neighboring node;

a transmitting unit configured to transmit a packet to the neighboring node through the virtual connection set up by the VC unit;

a maintaining unit configured to maintain virtual connections that have been set up by the VC unit and are not in use by the transmitting unit; and a control unit configured to control the VC unit to set up a new virtual connection, such that the maintaining unit holds at least one virtual connection with the neighboring node that is not currently in use by the transmitting unit by including said new virtual connection.

25. A node, connected to a virtual-connection-oriented network comprising:

a first section configured to set up a virtual connection with a neighboring node;

a second section configured to transmit a packet to the neighboring node through the virtual connection set up by the first section;

a third section configured to maintain virtual connections that have been set up by the first section and are not in use by the second section; and a fourth section configured to control the first section to set up a new virtual connection, such that the third section holds at least one virtual connection with the neighboring node that is not currently in use by the second section by including said new virtual connection.

* * * * *